United States Patent
Lau et al.

(10) Patent No.: US 11,238,583 B2
(45) Date of Patent: Feb. 1, 2022

(54) SYSTEM AND METHOD FOR GENERATING A STAINED IMAGE

(71) Applicant: City University of Hong Kong, Kowloon (HK)

(72) Inventors: Condon Lau, Kowloon (HK); Yixuan Yuan, Kowloon (HK); Chi Shing Cho, Kowloon (HK); Wah Cheuk, Kowloon (HK); Wan San Victor Ma, Kowloon (HK); Wing Lun Law, Kowloon (HK)

(73) Assignee: City University of Hong Kong, Kowloon (HK)

(*) Notice: Subject to any disclaimer, the term of this patent is extended or adjusted under 35 U.S.C. 154(b) by 0 days.

(21) Appl. No.: 16/829,629

(22) Filed: Mar. 25, 2020

(65) Prior Publication Data

US 2021/0304401 A1  Sep. 30, 2021

(51) Int. Cl.
*G06T 7/00* (2017.01)

(52) U.S. Cl.
CPC .................. *G06T 7/0012* (2013.01)

(58) Field of Classification Search
CPC . G01N 1/30; G01N 2001/2826; G06T 7/0012
See application file for complete search history.

(56) References Cited

U.S. PATENT DOCUMENTS

| | | | |
|---|---|---|---|
| 2004/0018528 A1* | 1/2004 | Morimoto | C12Q 1/485 435/6.14 |
| 2010/0074506 A1* | 3/2010 | Yamada | G01N 1/312 382/133 |
| 2011/0091377 A1* | 4/2011 | Alani | C12Q 1/6886 424/1.49 |
| 2020/0049599 A1* | 2/2020 | Alexander | A01N 1/0278 |

OTHER PUBLICATIONS

N. Bayramoglu et. al, "Towards Virtual H&E Staining of Hyperspectral Lung Histology Images Using Conditional Generative Adversarial Networks", IEEE International Conference on Computer Vision Workshops; 2017; Venice.
Y. Rivenson et. al, "Deep learning-based virtual histology staining using auto-fluorescence of label-free tissue", arXiv 2018.
A. Rana et. al, "Computational Histological Staining and Destaining of Prostate Core Biopsy RGB Images with Generative Adversarial Neural Networks", arXiv 2018.
Y. Rivenson et. al, "PhaseStain: the digital staining of label-free quantitative phase microscopy images using deep learning", Light Science & Applications 2019; 8:23.
E. A. Burlingame et. al, "SHIFT: speedy histopathological-to-immunofluorescent translation of whole slide images using conditional generative adversarial networks", PROC SPIE ISOE 2018.

* cited by examiner

*Primary Examiner* — John J Lee
(74) *Attorney, Agent, or Firm* — Renner Kenner Greive Bobak Taylor & Weber

(57) ABSTRACT

A system and method for generating a stained image including the steps of obtaining a first image of a key sample section; and processing the first image with a stain learning engine arranged to generate at least one stained image, wherein the at least one stained image represents the key sample section stained with at least one stain.

20 Claims, 4 Drawing Sheets

SYSTEM AND METHOD FOR GENERATING A STAINED IMAGE

TECHNICAL FIELD

The present invention relates to a system and method for generating a stained image, and particularly, although not exclusively, to a system and method for generating a virtually stained image of a tissue sample section.

BACKGROUND

The practice of histology is an important area of medical sciences that has helped with medical research, diagnosis and treatment. Part of this practice involves the preparation of slides which contain tissue sections. In turn, these slides can be placed under a microscope for further study or analysis.

In various situations, a staining agent or stain, may be used to stain the tissue sections. These staining agents allow certain cells, features or structures to become more visible when the slides are viewed or considered under magnification. However, the physical limitation is that a tissue section may only be stained in a particular manner (e.g. once, or in specific combinations) and thus various stains which may emphasize certain cells, features or structures may not be used after a one stain has already been applied.

The time and resources in preparing these slides are very significant and costly. Additionally, the physical limitations in using a limited number of staining agents will only limit the diagnoses or research of various conditions or diseases.

SUMMARY OF THE INVENTION

In accordance with a first aspect of the present invention, there is provided a method for generating a stained image comprising the steps of:
  obtaining a first image of a key sample section; and
  processing the first image with a stain learning engine arranged to generate at least one stained image, wherein the at least one stained image represents the key sample section stained with at least one stain.

In an embodiment of the first aspect, the key sample section is stained with a standard stain.

In an embodiment of the first aspect, the method further includes the step of obtaining an adjacent image of at least one adjacent sample obtained in proximity to the key sample section.

In an embodiment of the first aspect, the at least one adjacent sample section is stained with at least one non-standard stain.

In an embodiment of the first aspect, the at least one stained image represents the key sample section stained with at least one non-standard stain.

In an embodiment of the first aspect, the adjacent image of at least one adjacent sample section obtained is processed by the stain learning engine to generate the at least one stained image.

In an embodiment of the first aspect, the stain learning engine includes a machine learning network arranged to generate the at least one stained image.

In an embodiment of the first aspect, the machine learning network includes a generator network arranged to generate the at least one stained image over a plurality of cycles and a discriminator network arranged to analyze the at least one stained image to provide feedback to the generator network on each of the plurality of cycles.

In an embodiment of the first aspect, the machine learning network is a generative adversarial network.

In an embodiment of the first aspect, the generative adversarial network is trained with images of key sample sections and images of stained key sample sections.

In an embodiment of the first aspect, the generative adversarial network is further trained with images of adjacent sample sections adjacent to the key sample sections.

In an embodiment of the first aspect, the adjacent sample sections are stained.

In an embodiment of the first aspect, the standard stain includes hematoxylin and eosin (H&E).

In an embodiment of the first aspect, the non-standard stain includes special stains and/or immunostains.

In an embodiment of the first aspect, the key sample section and the at least one adjacent sample section are frozen.

In an embodiment of the first aspect, the key sample section and the at least one adjacent sample section are not formalin-fixed or embedded in paraffin.

In accordance with a second aspect of the present invention, there is provided a system for generating a stained image comprising:
  an image gateway arranged to obtain a first image of a key sample section; and
  an image generator arranged to process the first image with a stain learning engine arranged to generate at least one stained image, wherein the at least one stained image represents the key sample section stained with at least one stain.

In an embodiment of the second aspect, the key sample section is stained with a standard stain.

In an embodiment of the second aspect, the image gateway is further arranged to obtain an adjacent image of at least one adjacent sample obtained in proximity to the key sample section.

In an embodiment of the second aspect, the at least one adjacent sample section is stained with at least one non-standard stain.

In an embodiment of the second aspect, the adjacent image represents the key sample section stained with at least one non-standard stain.

In an embodiment of the second aspect, the at least one adjacent image of at least one adjacent sample section obtained is processed by the stain learning engine to generate the at least one stained image.

In an embodiment of the second aspect, the stain learning engine includes a machine learning network arranged to generate the at least one stained image.

In an embodiment of the second aspect, the machine learning network includes a generator network arranged to generate the at least one stained image over a plurality of cycles and a discriminator network arranged to analyze the at least one stained image to provide feedback to the generator network on each of the plurality of cycles.

In an embodiment of the second aspect, the machine learning network is a generative adversarial network.

In an embodiment of the second aspect, the generative adversarial network is trained with images of key sample sections and images of stained key sample sections.

In an embodiment of the second aspect, the generative adversarial network is further trained with images of adjacent sample sections adjacent to the key sample sections.

In an embodiment of the second aspect, the adjacent sample sections are stained.

In an embodiment of the second aspect, the standard stain includes hematoxylin and eosin (H&E).

In an embodiment of the second aspect, the non-standard stain includes special stains and/or immunostains.

In an embodiment of the second aspect, the key sample section and the at least one adjacent sample section are frozen.

In an embodiment of the second aspect, the key sample section and the at least one adjacent sample section are not formalin-fixed or embedded in paraffin.

In accordance with a third aspect of the present invention, there is provided a method of training a machine learning network comprising the steps of:
- inputting an image of a key sample section;
- inputting an image of a key sample section stained with a standard stain;
- inputting at least one image of an adjacent sample section, wherein the adjacent sample section is obtained in proximity to the key sample section;
- inputting at least one image of the adjacent sample section, wherein the adjacent sample section is stained with at least one non-standard stain.

BRIEF DESCRIPTION OF THE DRAWINGS

Embodiments of the present invention will now be described, by way of example, with reference to the accompanying drawings in which.

DETAILED DESCRIPTION OF THE PREFERRED EMBODIMENT

Figure 1:
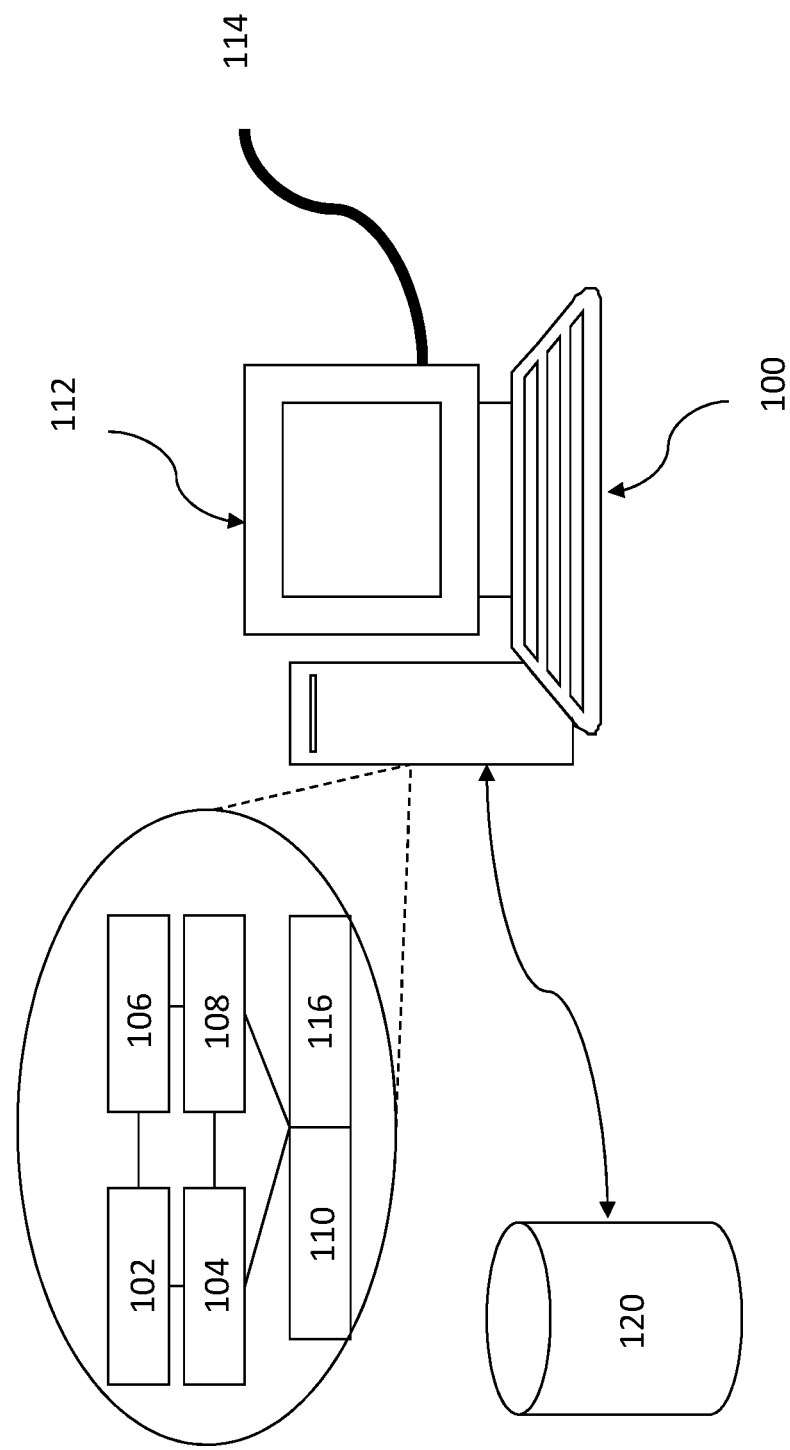
FIG. 1 is a schematic block diagram of a computer system implemented to operate as a system for generating a stained image in accordance with one embodiment of the present invention.

Referring to FIG. 1, an embodiment of the present invention is illustrated. This embodiment is arranged to provide a system for generating a stained image, comprising:
- an image gateway arranged to obtain a first image of a key sample section; and
- an image generator arranged to process the first image with a stain learning engine arranged to generate at least one stained image, wherein the at least one stained image represents the key sample section stained with at least one stain.

In this example embodiment, the image gateway and image generator are implemented by a computer having an appropriate user interface, communications port and processor. The computer may be implemented by any computing architecture, including stand-alone PC, client/server architecture, "dumb" terminal/mainframe architecture, portable computing devices, tablet computers, wearable devices, smart phones or any other appropriate architecture. The computing device may be appropriately programmed to implement the invention.

Referring to FIG. 1 there is a shown a schematic diagram of a computing system which in this embodiment comprises a server or computing device 100. The server 100 comprises suitable components necessary to receive, store and execute appropriate computer instructions. The components may include a processing unit 102, read only memory (ROM) 104, random access memory (RAM) 106, and input/output devices such as disk drives 108, input devices 110 such as an Ethernet port, a USB port, etc. Display 112 such as a liquid crystal display, a light emitting display or any other suitable display and communications links 114. The server 100 includes instructions that may be included in ROM 104, RAM 106 or disk drives 108 and may be executed by the processing unit 102. There may be provided a plurality of communication links 114 which may variously connect to one or more computing devices such as a server, personal computers, terminals, wireless or handheld computing devices such as tablet computers, smartphones or wearable devices. At least one of a plurality of communications link may be connected to an external computing network through a telephone line or other type of communications link.

The server may include storage devices such as a disk drive 108 which may encompass solid state drives, hard disk drives, optical drives or magnetic tape drives. The server 100 may use a single disk drive or multiple disk drives. The server 100 may be able to access one or more remote data storage devices, data bases or cloud-based data centre systems 120 to access information, retrieve data or to obtain or provide commands or instructions. The server 100 may also have a suitable operating system 116 which resides on the disk drive or in the ROM of the server 100.

In this example embodiment, the server or computing device 100 which may be implemented to operate as a system for generating a stained image that may be used to generate a virtual or simulated image of a tissue sample section that has been stained by any one or more of the various staining agents (or known as stains) available to allow medical professionals, scientists or researchers to identify specific features or markers within the tissue sample section.

In some example deployments, the system is arranged to operate with hospital or laboratory equipment to process tissue samples. The system may be connected or arranged to be in communication with an image source, such as a light or electron microscope or tissue image database so as to obtain images of tissue samples. Once an image of a tissue sample is obtained, the system is arranged to process this image so as to generate a new image of the tissue sample, but simulated to have been stained with one or more of various stains as desired by a user. These various stains include standard stains or staining agents such as hematoxylin and eosin (H&E) or non-standard stains or staining agents such as special stains and/or immunostains. Preferably, the system operates to generate a virtual or generated stain image of a tissue sample section which is different to an image of a first stain of the tissue sample. Thus, as an example, if the first image is of a tissue sample which has been stained with a first such as H&E, the generated stain image may be of the tissue sample having been stained with a different stain, such as an immunostain.

These generated images, which simulate or model a tissue sample section having been stained with one or more stains or staining agents may in turn be provided to users so as to allow the user to diagnose or provide medical or biological assessments. The generation of these simulated or modelled images may be advantageous as the staining process may alter the physical characteristics of each tissue sample section. This will in turn mean that should a staining agent be used on an example tissue sample section, another staining agent may not be used and thus limiting the presentation of the tissue sample section for research or diagnosing purposes. The ability in generating these simulated or modelled images would therefore allow users to obtain images of tissue sample sections that have been stained with various stains.

By generating simulated and modelled images of stained tissue sample sections, images of tissue sample sections may be simulated to have been stained with various staining agents and thus allowing for greater scope for research or diagnoses purposes. This will in turn improve research and development in the biological and medical science as well as in medical or veterinary treatments. Moreover, examples of the present system for generating a stained image may also be advantageous as the generation of stained images are much faster than the process of physical staining. This offers significant advantages in pathology practices where the analysis of tissue samples is time critical.

Figure 2:
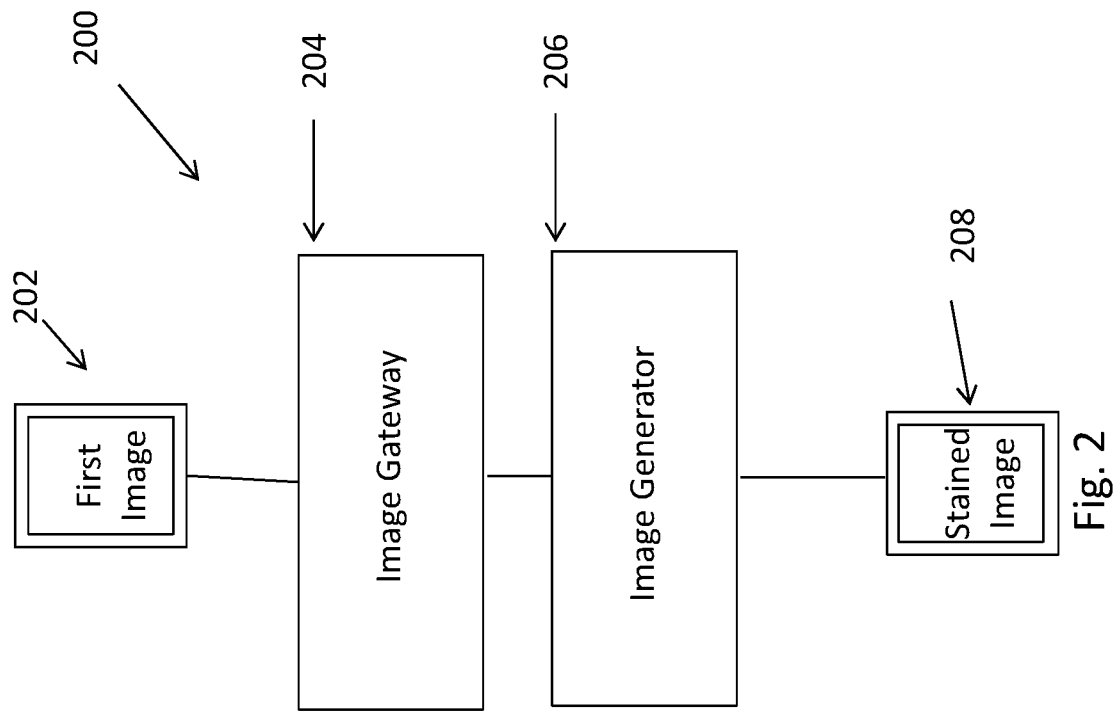
FIG. 2 is a block diagram illustrating the operation process of the system for generating a stained image of FIG. 1.

With reference to FIG. 2, there is illustrated a block diagram illustrating the process flow of am example embodiment of a system for generating a stained image 200. In this example embodiment, the system 200 firstly acquires images of frozen tissue sections 202. These tissue sections, may also be referred to as the key tissue sections or key sample sections and may be unstained, or stained with one or more staining agents, such as hematoxylin and eosin (H&E).

It follows that these images 202 are inputted to the system via an image gateway 204. The image gateway 204, which may be a suitable input device and may be arranged to receive image data from various sources, including from light or electron microscopes, databases, computer networks, computer cloud servers, portable storage devices or other electronic, processing or storage devices. The images 202 that are inputted may be one or more images of tissue sample sections, with or without various stains. Images of adjacent samples with or without various stains may also be optionally inputted also to the image gateway 204. These may be necessary or optional depending on the intention of the user and the level of pre-training undertaken of the image generator 206, which will be described in further detail below with reference to FIGS. 2 and 3.

As shown in this embodiment, the image generator 206 is arranged to receive an image of a tissue sample section 202 and regenerate a new image of the tissue sample section 208 having been stained with one or more staining agents. Preferably, this is performed by a machine learning processor, described further in FIG. 3, within the image generator 206 to simulate the tissue sample section having been stained with a particular staining agent. This machine learning processor may be any type of machine learning architecture capable of learning or retaining knowledge after it has been trained with a sample training set. Preferably, the machine learning processor includes a machine learning network 306, such as a neural network, convolution neural network (CNN), or as described below in one example implementation, a generative adversarial network (GAN).

The machine learning network 306 is arranged to be trained with a plurality of training images of tissue sample sections and stained tissue sample sections. In turn, a trained machine learning network would be able to receive a tissue sample section image as an input and generate a simulated image of the tissue sample section as shown in the tissue sample section image but having been stained with various staining agents. This generated simulated image of the tissue sample section may then be output to the user for further processing, or if necessary, re-training of the machine learning network 306.

Figure 3:
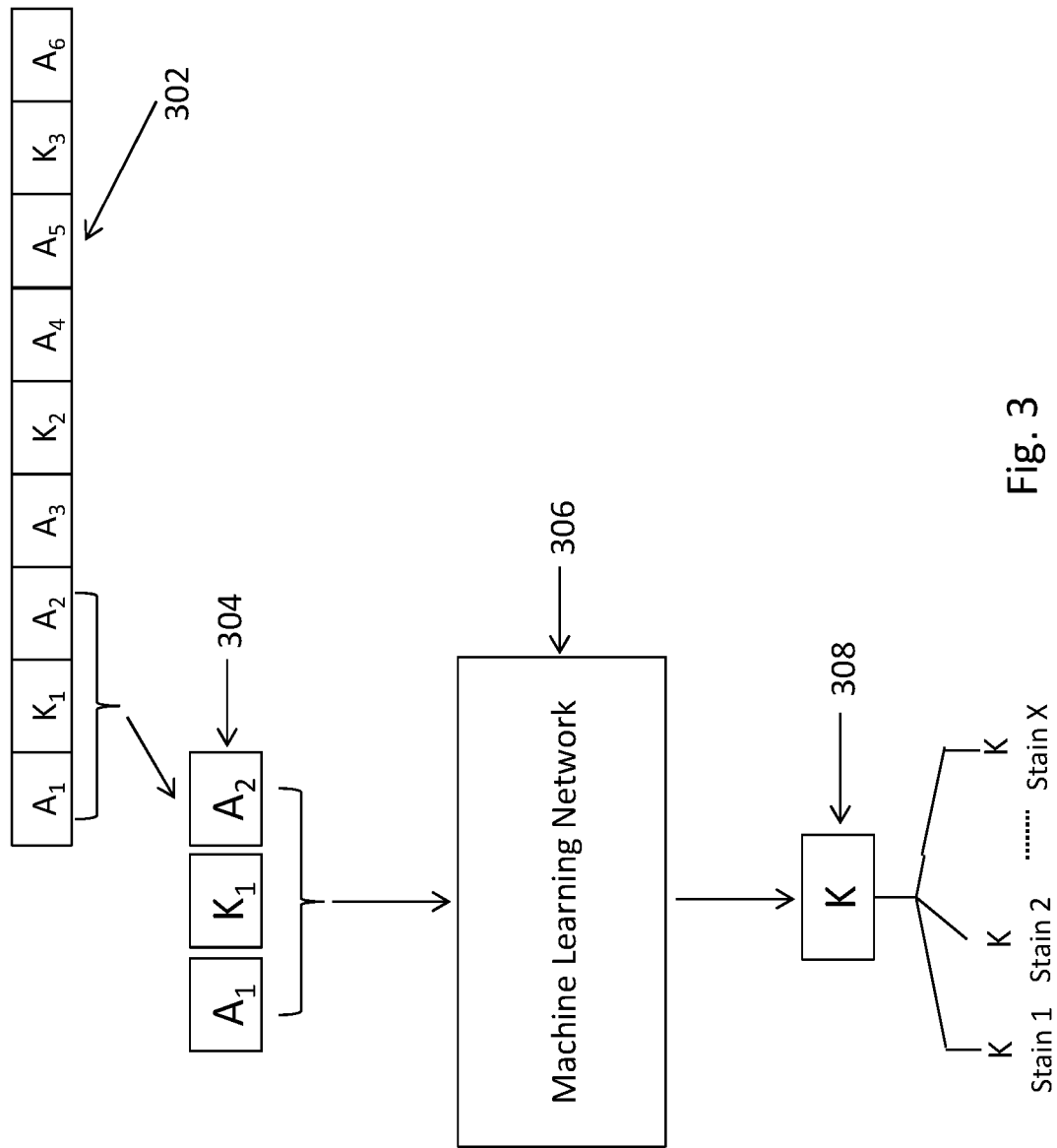
FIG. 3 is a block diagram illustrating the operation of an example machine learning network of the system for generating a stained image of FIG. 2.

With reference to FIG. 3, there is illustrated a block diagram for an example machine learning processor having a machine learning network 306. The block diagram of FIG. 3 is arranged to show an example operation of the machine learning network 306 to generate one or more simulated images 308. The machine learning network may firstly be trained with a suitable training data set, which may, for example, include numerous images of tissue sample sections, adjacent tissue sample sections, stained with various staining agents. Once the network 306 is suitably trained such that it is able to provide an acceptable level of accuracy, images 304 of tissue sample sections 302 may be fed into the network so as to generate an image of the tissue sample sections, simulated to have been stained with one or more staining agents.

As shown in FIG. 3, the input images 304 herein include an image of a key tissue sample section (K1), which may be one of various key tissue sample sections from one or more collections of tissue samples 302. A1 and A2 are images of adjacent tissue samples sections, which are tissue sample sections adjacent to the key tissue sample section. It is noted that the adjacent tissue samples need not be necessarily adjacent in a physical sense, but it may be in a proximate position, or any other position whereby and preferably, there may be some similarities, structural or otherwise may be established with the key tissue sample section such that the morphology between the two sample sections may share some similarities.

These adjacent tissue sample sections A1, A2, may also, be stained, such as with one or more staining agents that would be desirable for simulating the key tissue sample sections being stained with the same staining agent. In turn, these images of adjacent tissue sample sections A1, A2 would therefore present a similar structure to the key tissue sample sections, whilst having been stained with one or more different staining agents. At its bases, these adjacent images A1, A2 would therefore provide information or guidance as to how the key tissue sample sections should appear K1 when it is also stained with one or more different staining agents, and this information may be usable as knowledge within the machine learning network to generate a simulated image of the key tissue sample sections having been stained with alternative staining agents.

When the key tissue sample sections K1 are stained, it follows that these images of the key tissue sample sections K1 or adjacent tissue sample sections A1, A2 may be acquired by various means, including by direct access to the output of a light/electron microscope or obtaining these images as a collective set from storage or computing devices or telecommunication devices. In one example usage scenario, the adjacent tissue sections A1, A2 may be tissue sections that are adjacent to the key sample sections K1, and thus may be obtained from a proximate position to the key sample sections K1. As an example of these adjacent tissue sections, the adjacent tissue sections may include the previous tissue slide or the next tissue slide. One unique property of these adjacent tissue sections is that they may represent a similar tissue structure as the key sample sections as they are proximate or directly adjacent to the key sample section. These similarities in tissue structure may therefore be exploited for the generation of a virtual stain of the key sample sections.

In this example procedure, these adjacent tissue sections A1, A2 may also be stained with other stains, such as special stains and/or immunostains. In turn, images of these adjacent tissue sections, referred to as adjacent images, may therefore show an image of a tissue sample section K1 that would have a similar tissue structure to the key sample, but stained with a different stain. This would in turn, provide the basis for a similarity or relationship between the key tissue sample K1, either unstained or stained with a first staining agent, and an adjacent tissue sample A1 or A2, stained with another staining agent.

These sets of images 304 from multiple samples 302 may in turn be used to train a stain learning engine, which may include a machine learning network 306 or processor. After training such an engine, the machine learning network 306 or processor may then be able to take unstained or stained (e.g. H&E) images as inputs, and output images of the same tissue section that have been stained with a different staining agent 308. In turn, allowing medical professionals, scientists or researchers a virtual image of the tissue sample as stained in one of various staining agents available, including standard agents such as H&E as well as other non-standard or alternative staining agents, such as special stains or immunostains. These virtual images may in turn allow scientists or medical professionals to diagnose medical conditions, detect for various results or for further research or may be presented to the end user for other scientific, analysis, storage, processing or diagnosing purposes.

Figure 4:
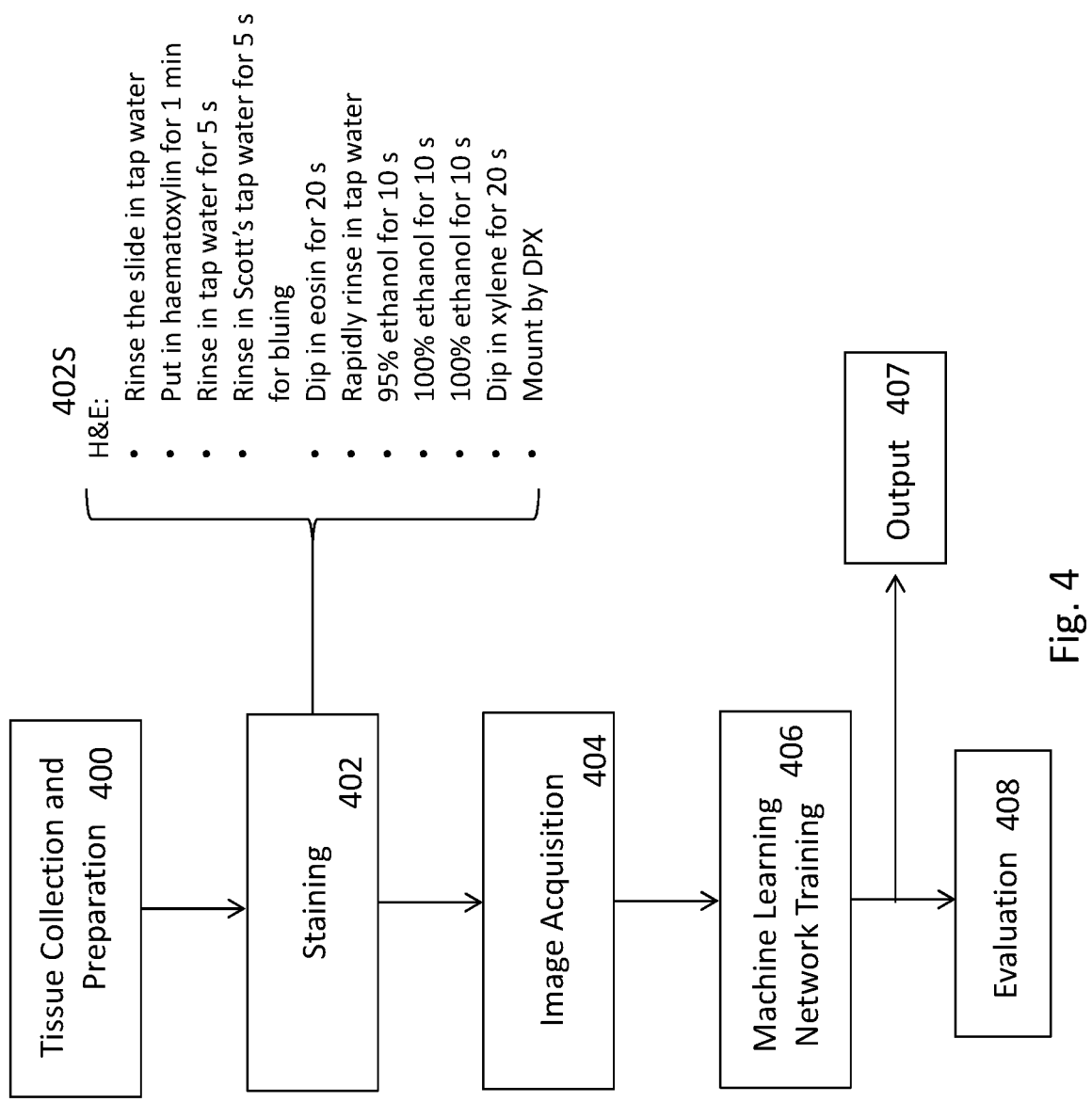
FIG. 4 is a process flow diagram illustrating an example set of method steps to generate a stained image with the system for generating a stained image of FIG. 1.

In one example embodiment as referenced in FIG. 4, the inventors performed an experimental operation of an example of the system for generating a stained image by undertaken 5 example steps (400, 402, 404, 406 and 408). The results indicated that the system for generating a stained network may operate with existing hospital or lab procedures in obtaining real tissue samples and is able to generate accurate results of simulated tissue sample sections stained that would be deemed adequate for diagnosing or research purposes by experts. The five steps undertaken by the inventors are described below with reference to FIG. 4.

Stage 1—Tissue Collection and Preparation 400

The method of generating stained images preferably requires an image of at least one tissue sample section for processing so as to generate a virtual stained image. Accordingly, in this example experiment, the inventors or users may firstly obtain a biopsy-sized tissue specimens (millimeters), such as those from surgical discarded tissue so as to prepare frozen sections from the specimens. Images of these specimens may in turn be used to train the machine learning network used in this example method of generating stained images.

According to trials and experimentations performed by the inventors, N=100 is the estimated minimum sample size for training an example machine learning network. A further additional samples of (N>=10) may be needed for prospective evaluation.

To obtain these samples, the procedures described below are similar to those of standard hospital frozen section procedures. This will aid clinical translation of this experiment example of a system for generating a stained image into a clinical environment. Punch biopsies may be used to collect at least one sample from each tissue specimen.

As a test sample, the inventors obtained a tissue sample from a rat that is firstly placed on a mould and optimum cutting temperature (OCT) compound is applied to cover the sample. The tissue is snap frozen in isopentane and is placed in the shelf of the cryostat to await sectioning.

Following from this procedure, the holder may then be placed over the tissue and the assembly placed in the frozen chamber at around −22 C. The blade is inserted and the tissue trimmed of excess OCT. A 5 μm thick section is cut, followed by a series of at least n adjacent sections. n is two sections for each non-H&E stain (see next stage). A cooled brush is used to spread the tissue section on the antiroll plate. A room temperature glass slide (for microscopy) is pressed onto the tissue, which adheres due to the temperature difference. The tissue is rapidly fixed by immersing in 95% ethanol for several seconds. The sections are now ready for staining.

Stage 2—Staining 402

The staining stage which follows stage 1 above may stain the adjacent sections of each tissue sample prepared in the previous stage (stage 1, 400). In this example experiment, the inventors arranged for every other section from each sample to be stained with H&E. The remaining sections are then stained with special or immunostains. Common examples that can be used include cytokeratin markers, SOX10, and P40. Later, during the image acquisition phase (404) and machine learning network training (later in stage 3 and stage 4), the brightfield and autofluorescence images of a H&E section was transformed to the brightfield or fluorescence image of the adjacent section, which has a different stain.

As the sections are within micrometers of each other, the tissue microarchitecture is very similar. An example H&E staining protocols 402S for frozen sections is given below.

H&E:

Rinse the slide in tap water
Put in haematoxylin for 1 min
Rinse in tap water for 5 s
Rinse in Scott's tap water for 5 s for bluing
Dip in eosin for 20 s
Rapidly rinse in tap water
95% ethanol for 10 s
100% ethanol for 10 s
100% ethanol for 10 s
Dip in xylene for 20 s
Mount by DPX For the special and immunostains, one may follow the protocol determined by the manufacturer.

Examples of the above preparation procedure suitable for use with an example method and system for generating stained images are advantageous as the ability of the system and method for generating stained images are able to work with frozen sections, rather than the more common formalin-fixed, paraffin embedded sections, which are unnecessary or not required when operating with an example embodiment of the system for generating a stained image. As the inventor's experiment shows, the method for generating a stained image does not require the common formalin-fixed, paraffin embedding of sections to be performed on the tissue samples. This in turn is advantageous as it renders the preparation of tissue sample sections to be faster, more effective and less expensive. Moreover, the advantages offered may result in faster tissue processing time that is particularly advantageous in surgical procedures where fast diagnoses are required for treatment.

Stage 3—Image Acquisition 404

This third stage 404 may acquire microscope images for training the machine learning network. Brightfield and autofluorescence images may be acquired from all H&E sections. Brightfield or fluorescence images may also be acquired from the special/immuno stained sections. The choice of brightfield or fluorescence, including which filter set, depends on the specific stain used. In the next stage, the machine learning network will be trained to transform the two H&E images of a section into the stain of the adjacent section.

Preferably, the inventors had chosen to obtain the input images after H&E staining as this is less likely to disrupt hospital protocol and thus examples of the method and system for generating stained images may be advantageous as it may operate with existing hospital settings as H&E staining is always performed on frozen sections. In turn, allowing examples of the system and method for generating stained images to operate with existing hospital protocol with minimum disruption.

In this example, microscope image acquisition may be performed with a high-resolution microscope (eg. Nikon Eclipse Upright microscope), capable of fluorescence and brightfield microscopy. The slide with tissue section will be placed on the stage. Images may then be captured with multiple (eg. 4 and 40×) objectives, and 10× eyepiece. The sensor preferably has a high pixelation (eg. 3376×2704).

Autofluorescence will be acquired with the FITC (465-495 nm excitation, 515-555 nm emission) filter set. The slide will be automatically translated with the stage to acquire multiple FOVs until the entire section is imaged. This is advantageous as translating the stage will allow larger samples to be imaged and provide more training data. Fluorescence images of stains may also be acquired with the filter set the specific stain is designed for. Brightfield images will be acquired with illumination from the halogen lamp.

Preferably, the key image acquisition settings, such as camera exposure time and gain, will be set manually. This is to ensure that acquisition settings remain constant across samples.

Stage 4—Training the Machine Learning Network 406

As images of the tissue samples have been obtained, these images may then be used to train the machine learning network by using the microscope images acquired above. In one example embodiment, the machine learning network may be trained to take an input such as brightfield and autofluorescence images of a H&E stained tissue section so as to generate an output that is the adjacent tissue section with a different stain. As adjacent tissue slices are very similar morphologically, the machine learning network may be trained to virtually apply such a stain when generating the stained image 407 as an output.

Preferably, one machine learning network may be trained per non-H&E stain. After training, the network may then receive the input images, such as of a frozen section of a surgery patient, and generate multiple images of the section under different stains.

During trials, experimentations and research, the inventors had found that various machine learning networks are possible to achieve similar results. However, in a preferred example, the inventors had employed a conditional generative adversarial network (cGAN) architecture designed for lung histology images such as the cGAN presented at Neslihan Bayramoglu MK, Lauri Eklund, Janne Heikkila. Towards Virtual H&E Staining of Hyperspectral Lung Histology Images Using Conditional Generative Adversarial Networks. IEEE International Conference on Computer Vision Workshops; 2017; Venice.

As a cGAN is an extension of the original GAN, which has competing generator and discriminator networks. The generator is trained to map H&E images to images under other stains while the discriminator is simultaneously trained to assess if generator outputs are true or fake. In cGAN, the networks are conditioned on additional (image) information.

In one example, the inventors had used a U-Net architecture for the generator and the ImageGAN classifier for the discriminator. The network is trained on a custom computer cluster (eg. Precision 5820 Tower XCTO Base, Dell) and thus proven that the system may operate with ordinary desktop computers as found in hospitals or labs.

Stage 5—Prospective Evaluation 408

This final stage is optional and was completed by the inventors as part of their trials and experimentations to evaluate the accuracy of the images generated by the method and system for generating stained images. In this example, the inventors evaluated the accuracy of the trained machine learning network on additional H&E stained tissue sections (N>=10 of each tissue type which were not part of training set).

As in stages 1-3 (400 to 404), the extra tissues were to be extracted from surgical discarded tissues and prepared as frozen sections, stained, and imaged. The brightfield and autofluorescence images of the H&E sections were used as inputs whilst the example embodiment of the method and system for generating stained images generated the various outputs 407 (other stains) of the key tissue sample sections.

The inventors then took the images outputted by the system and qualitatively and quantitatively compared these images with the chemically stained image on the neighboring section. The inventors in turn arranged for experienced pathologists and histotechnologists to make qualitative comparisons by comparing microscopic anatomical features.

In this example experiment, the quantitative comparisons employ two metrics:
1. Intensity differences at each pixel for each color channel (RGB), mean and standard deviation across all ten image pairs. For grayscale images (ie. fluorescence), one intensity difference will be computed.
2. Structural similarity index [4], which is designed to quantify human observations, mean and standard deviation across all ten pairs.

The inventors had found that in their experimentations, a high level of accuracy was achieved. Experienced pathologists and histotechnologists had found that the generated images had shown strong accuracy and thus demonstrating that the system and method for generating stained images, with effective training, may be able to provide an accurate simulation or model of a tissue sample section, stained with one or more staining agents.

Example embodiments of the system for generating stained images is advantageous as it may offer a service to virtually stain frozen tissue sections for histopathological assessment. The system and methods is arranged to receive input images of a section stained with a standard stain, such as H&E and outputs images of the same section under different stains. In turn, the system may be suitable for use for intraoperative use during tumor resection surgery.

In these example uses, during the surgical procedure, it may be important to know if all the cancer cells have been removed (ie. clear margins). This is assessed by taking small tissue samples from the periphery of the surgical area and preparing frozen tissue sections. The sections are stained for contrast to help distinguish cancer from normal cells, and assessed under a microscope by a pathologist.

Due to time constraints, as the patient is waiting anesthetized in the operating room, the frozen sections procedure, including assessment, must be done in minutes. This greatly limits the number and type of stains that can be used to give contrast, typically just a standard staining agent such as H&E.

Unfortunately, pathologists often have difficulty making an accurate diagnosis from H&E alone. Having the ability to stain with other stains, such as immunostains (eg. for cytokeratin, P40, SOX10) would help immensely with accurate diagnosis. Accordingly, embodiments of the system for generating stained images may make staining frozen sections with other stains possible because of its ability to generate virtually stained images much faster than actual staining with antibodies (seconds vs. hours, even days). Accordingly, the system may be advantageous to intraoperative pathology.

Although not required, the embodiments described with reference to the Figures can be implemented as an application programming interface (API) or as a series of libraries for use by a developer or can be included within another software application, such as a terminal or personal computer operating system or a portable computing device operating system. Generally, as program modules include routines, programs, objects, components and data files assisting in the performance of particular functions, the skilled person will understand that the functionality of the software application may be distributed across a number of routines, objects or components to achieve the same functionality desired herein.

It will also be appreciated that where the methods and systems of the present invention are either wholly implemented by computing system or partly implemented by computing systems then any appropriate computing system architecture may be utilised. This will include stand-alone computers, network computers and dedicated hardware devices. Where the terms "computing system" and "computing device" are used, these terms are intended to cover any appropriate arrangement of computer hardware capable of implementing the function described.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

Any reference to prior art contained herein is not to be taken as an admission that the information is common general knowledge, unless otherwise indicated.

The invention claimed is:

1. A method for generating a stained image comprising the steps of:
    obtaining a first image of a key sample section;
    processing the first image with a stain learning engine arranged to generate at least one stained image, wherein the at least one stained image represents the key sample section stained with at least one stain, and the key sample section is stained with a standard stain; and
    obtaining an adjacent image of at least one adjacent sample section obtained in proximity to the key sample section, wherein the at least one adjacent sample section is stained with at least one non-standard stain;
wherein the at least one stained image represents the key sample section stained with at least one non-standard stain; and
wherein the adjacent image of at least one adjacent sample section obtained is processed by the stain learning engine to generate the at least one stained image.

2. A method for generating a stained image comprising the steps of:
    obtaining a first image of a key sample section; and
    processing the first image with a stain learning engine arranged to generate at least one stained image, wherein the at least one stained image represents the key sample section stained with at least one stain, wherein the key sample section is stained with a standard stain, the stain learning engine includes a machine learning network arranged to generate the at least one stained image, and the machine learning network includes a generator network arranged to generate the at least one stained image over a plurality of cycles and a discriminator network arranged to analysis the at least one stained image to provide feedback to the generator network on each of the plurality of cycles.

3. A method for generating a stained image in accordance with claim 2, wherein the machine learning network is a generative adversarial network.

4. A method for generating a stained image in accordance with claim 3, wherein the generative adversarial network is trained with images of key sample sections and images of stained key sample sections.

5. A method for generating a stained image in accordance with claim 4, wherein the generative adversarial network is further trained with images of adjacent sample sections adjacent to the key sample sections.

6. A method for generating a stained image in accordance with claim 5, wherein the adjacent sample sections are stained.

7. A method for generating a stained image comprising the steps of:
    obtaining a first image of a key sample section; and
    processing the first image with a stain learning engine arranged to generate at least one stained image, wherein the at least one stained image represents the key sample section stained with at least one stain, and the key sample section is stained with a standard stain; and
    obtaining an adjacent image of at least one adjacent sample section obtained in proximity to the key sample section, wherein the at least one adjacent sample section is stained with at least one non-standard stain, and the standard stain includes hematoxylin and eosin (H&E).

8. A method for generating a stained image in accordance with claim 7, wherein the non-standard stain includes special stains and/or immunostains.

9. A method for generating a stained image in accordance with claim 8, wherein the key sample section and the at least one adjacent sample section are frozen.

10. A method for generating a stained image in accordance with claim 9, wherein the key sample section and the at least one adjacent sample section are not formalin-fixed or embedded in paraffin.

11. A system for generating a stained image comprising:
    an image gateway arranged to obtain a first image of a key sample section; and
    an image generator arranged to process the first image with a stain learning engine arranged to generate at least one stained image, wherein the at least one stained image represents the key sample section stained with at least one stain, the key sample section is stained with a standard stain, the image gateway is further arranged to obtain at least one adjacent image of at least one adjacent sample section obtained in proximity to the key sample section, the at least one adjacent sample section is stained with at least one non-standard stain, the at least one stained image represents the key sample section stained with at least one non-standard stain; and the at least one adjacent image of at least one adjacent sample section obtained is processed by the stain learning engine to generate the at least one stained image.

12. A system for generating a stained image comprising:
    an image gateway arranged to obtain a first image of a key sample section; and
    an image generator arranged to process the first image with a stain learning engine arranged to generate at least one stained image, wherein the at least one stained image represents the key sample section stained with at least one stain, the key sample section is stained with a standard stain, the stain learning engine includes a machine learning network arranged to generate the at least one stained image; and the machine learning network includes a generator network arranged to generate the at least one stained image over a plurality of cycles and a discriminator network arranged to analysis the at least one stained image to provide feedback to the generator network on each of the plurality of cycles.

13. A system for generating a stained image in accordance with claim 12, wherein the machine learning network is a generative adversarial network.

14. A system for generating a stained image in accordance with claim 13, wherein the generative adversarial network is trained with images of key sample sections and images of stained key sample sections.

15. A system for generating a stained image in accordance with claim 14, wherein the generative adversarial network is further trained with images of adjacent sample sections adjacent to the key sample sections.

16. A system for generating a stained image in accordance with claim 15, wherein the adjacent sample sections are stained.

17. A system for generating a stained image comprising:
an image gateway arranged to obtain a first image of a key sample section; and
an image generator arranged to process the first image with a stain learning engine arranged to generate at least one stained image, wherein the at least one stained image represents the key sample section stained with at least one stain, the key sample section is stained with a standard stain, the image gateway is further arranged to obtain at least one adjacent image of at least one adjacent sample section obtained in proximity to the key sample section, the at least one adjacent sample section is stained with at least one non-standard stain, and the standard stain includes hematoxylin and eosin (H&E).

18. A system for generating a stained image in accordance with claim 17, wherein the non-standard stain includes special stains and/or immunostains.

19. A system for generating a stained image in accordance with claim 18, wherein the key sample section and the at least one adjacent sample section are frozen.

20. A system for generating a stained image in accordance with claim 19, wherein the key sample section and the at least one adjacent sample section are not formalin-fixed or embedded in paraffin.

* * * * *